US012682222B2

(12) United States Patent (10) Patent No.: US 12,682,222 B2
Liu et al. (45) Date of Patent: Jul. 14, 2026

(54) AUTOMATIC CORRELATION OF TEST LOGS WITH SERVICE TICKET

(71) Applicant: Dell Products L.P., Round Rock, TX (US)

(72) Inventors: Zhengchu Liu, Neihu (TW); Zhenhua Sun, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 527 days.

(21) Appl. No.: 18/358,226

(22) Filed: Jul. 25, 2023

(65) Prior Publication Data

US 2025/0036925 A1 Jan. 30, 2025

(51) Int. Cl.
*G06N 3/048* (2023.01)
(52) U.S. Cl.
CPC ..................................... *G06N 3/048* (2023.01)
(58) Field of Classification Search
CPC .......... G06N 3/048; G06N 3/045; G06N 3/08; G06N 5/04; G06N 5/022
See application file for complete search history.

(56) References Cited

U.S. PATENT DOCUMENTS

| | | | |
|---|---|---|---|
| 10,438,212 B1 * | 10/2019 | Jilani | ..................... G06N 5/025 |
| 10,949,765 B2 * | 3/2021 | Duraisamy Soundrapandian | ....... |
| | | | G06F 40/30 |
| 10,997,500 B1 * | 5/2021 | Vishnu Narayanan | ..................... |
| | | | G06N 3/084 |
| 11,809,271 B1 * | 11/2023 | Wang | ..................... G06F 11/008 |
| 12,271,292 B2 * | 4/2025 | Waldron | ............. G06F 11/3692 |
| 12,373,683 B2 * | 7/2025 | Muhammad | ........... G06N 3/044 |
| 2020/0372415 A1 * | 11/2020 | Mann | ..................... G06Q 10/04 |

* cited by examiner

*Primary Examiner* — Hosuk Song
(74) *Attorney, Agent, or Firm* — Amin, Turocy & Watson, LLP

(57) ABSTRACT

Automatic correlation of test logs with service ticket (e.g., using a computerized tool), is enabled. For example, a system can comprise: a processor and a memory that stores executable instructions that, when executed by the processor, facilitate performance of operations, comprising, based on test log data representative of test logs and using machine learning attention, generating a test log output vector, based on the test log output vector and a service ticket output vector, determining a probability of a relation between a test log represented in the test log output vector and a service ticket represented in the service ticket output vector, and in response to the probability being determined to satisfy a threshold relation probability, marking the test log and the service ticket as related.

20 Claims, 13 Drawing Sheets

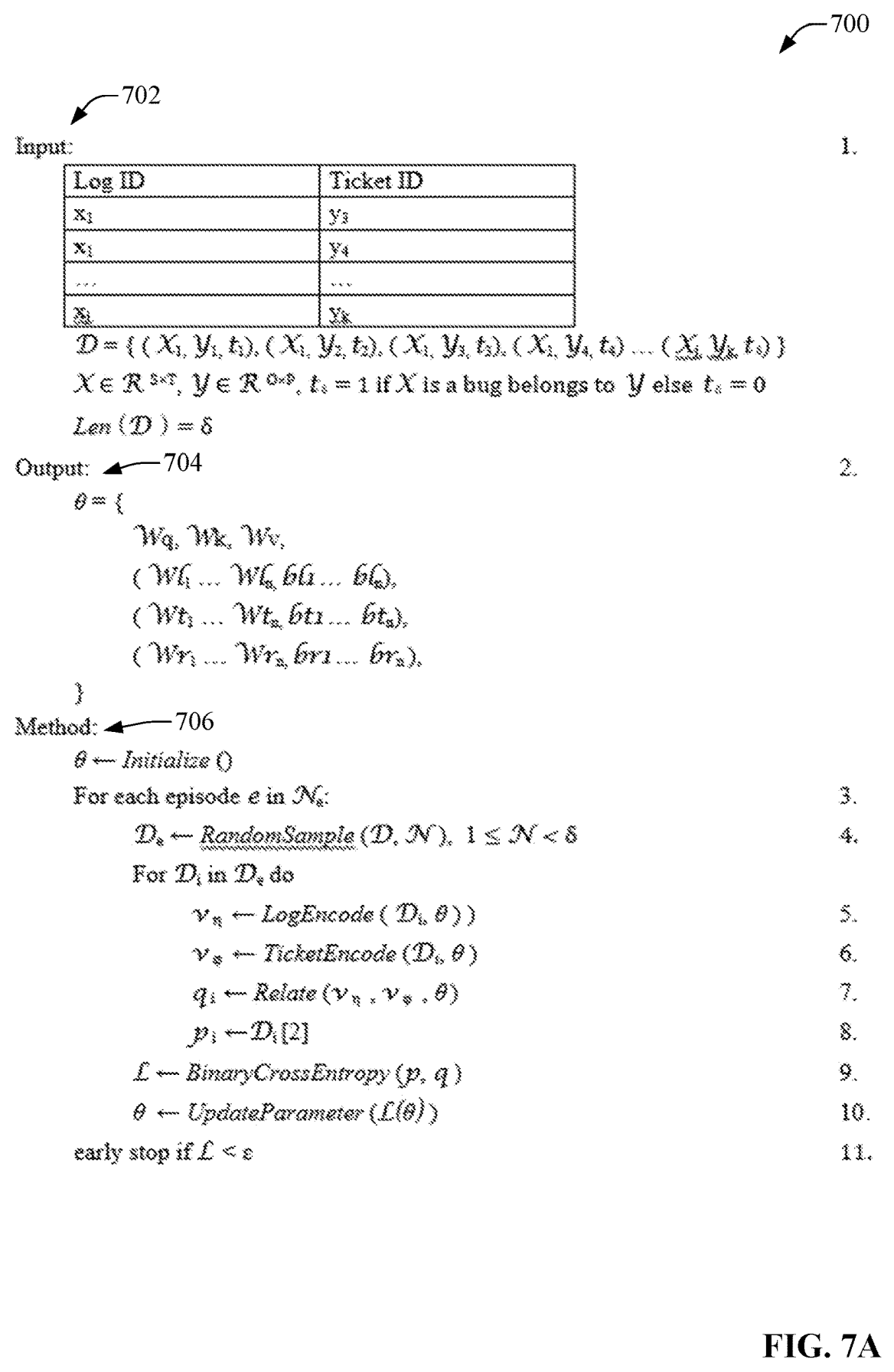

700

702

Input:                                                                                                    1.

| Log ID | Ticket ID |
|--------|-----------|
| $x_1$  | $y_3$     |
| $x_1$  | $y_4$     |
| ...    | ...       |
| $x_k$  | $y_k$     |

$\mathcal{D} = \{ (X_1, y_1, t_1), (X_1, y_2, t_2), (X_1, y_3, t_3), (X_1, y_4, t_4) \ldots (X_k, y_k, t_\delta) \}$ $X \in \mathcal{R}^{s \times \tau}, \; y \in \mathcal{R}^{o \times p}, \; t_\delta = 1$ if $X$ is a bug belongs to $y$ else $t_\delta = 0$ $Len(\mathcal{D}) = \delta$ Output:  704                                                                                          2.

$\theta = \{$ $\quad W_q, W_k, W_v,$ $\quad (Wl_1 \ldots Wl_a, bl_1 \ldots bl_a),$ $\quad (Wt_1 \ldots Wt_a, bt_1 \ldots bt_a),$ $\quad (Wr_1 \ldots Wr_a, br_1 \ldots br_a),$ $\}$ Method:  706

$\theta \leftarrow Initialize()$

For each episode $e$ in $\mathcal{N}_e$:                                                              3.

$\quad \mathcal{D}_e \leftarrow RandomSample(\mathcal{D}, \mathcal{N}), \; 1 \leq \mathcal{N} < \delta$   4.

$\quad$ For $\mathcal{D}_i$ in $\mathcal{D}_e$ do $\quad\quad v_{l} \leftarrow LogEncode(\mathcal{D}_i, \theta)$                                         5.

$\quad\quad v_{t} \leftarrow TicketEncode(\mathcal{D}_i, \theta)$                                      6.

$\quad\quad q_i \leftarrow Relate(v_l, v_t, \theta)$                                                   7.

$\quad\quad p_i \leftarrow \mathcal{D}_i[2]$                                                           8.

$\quad L \leftarrow BinaryCrossEntropy(p, q)$                                                          9.

$\quad \theta \leftarrow UpdateParameter(L(\theta))$                                                   10.

early stop if $L < \varepsilon$                                                                       11.

FIG. 7A

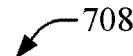
708

*NeuralNetwork:*

$$v_{out} \leftarrow Relu(\dots Relu(v_{in} W_1 + b_1) W_2 + b_2 \dots) W_n + b_n$$  Equation (1)

in which $v$ is a vector

*SoftmaxNeuralNetwork:*

$$q_{out} \leftarrow Softmax(Relu(\dots Relu(v_{in} W_1 + b_1) W_2 + b_2 \dots) W_n + b_n)$$  Equation (2)

in which $q$ represents a probability

*LogEncode:*

$$\hat{v}_n \leftarrow Attention(Q, \mathcal{K}, V) = Softmax\left(\frac{Q \mathcal{K}^T}{\sqrt{d_c}}\right) V$$  Equation (3)

in which $X = \mathcal{D}_i[0]$, $Q = W_q X^T$, $\mathcal{K} = W_k X^T$, $V = W_v X^T$, $d_c$ is the dimension of $X$ $\hat{v}_n$ is a vector $$v_n \leftarrow NeuralNetwork(\hat{v}_n, (W_{l1} \dots W_{ln}, b_{l1} \dots b_{ln}))$$  Equation (4)

in which $v_n$ is a vector

*TicketEncode:*

$$v_\phi \leftarrow Flatten(NeuralNetwork(y^T, (W_{t1} \dots W_{tn}, b_{t1} \dots b_{tn})))$$  Equation (5)

in which $v_\phi$ is a vector

*Relate:*

$$q \leftarrow SoftmaxNeuralNetwork($$
$$Concat(v_n, v_\phi), (W_{r1} \dots W_{rn}, b_{r1} \dots b_{rn})))$$  Equation (6)

in which $q$ represents a probability

*BinaryCrossEntropy:*

$$\mathcal{L}(\theta) = -\frac{1}{N} \sum_{i=1}^{N} p_i \log q_i(\theta) + (1 - p_i) \log(1 - q_i(\theta))$$  Equation (7)

*UpdateParameter:*

$$a \leftarrow Adam(\beta_1, \beta_2)$$  Equation (8)

for each component $\theta_c$ of $\theta$: $\theta_c = \theta_c - a \nabla \mathcal{L}(\theta_c)$

FIG. 7B

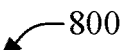
800

802 — BASED ON TEST LOG DATA REPRESENTATIVE OF TEST LOGS AND USING MACHINE LEARNING ATTENTION, GENERATING A TEST LOG OUTPUT VECTOR

804 — BASED ON THE TEST LOG OUTPUT VECTOR AND A SERVICE TICKET OUTPUT VECTOR, DETERMINING A PROBABILITY OF A RELATION BETWEEN A TEST LOG REPRESENTED IN THE TEST LOG OUTPUT VECTOR AND A SERVICE TICKET REPRESENTED IN THE SERVICE TICKET OUTPUT VECTOR

806 — THRESHOLD SATISFIED?

NO

YES

808 — IN RESPONSE TO THE PROBABILITY BEING DETERMINED TO SATISFY A THRESHOLD RELATION PROBABILITY, MARKING THE TEST LOG AND THE SERVICE TICKET AS RELATED

FIG. 8

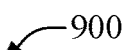

902 — BASED ON TEST LOG DATA REPRESENTATIVE OF TEST LOGS AND USING MACHINE LEARNING ATTENTION, GENERATING A TEST LOG OUTPUT VECTOR

904 — BASED ON THE TEST LOG OUTPUT VECTOR AND A SERVICE TICKET OUTPUT VECTOR, DETERMINING A PROBABILITY OF A RELATION BETWEEN A TEST LOG REPRESENTED IN THE TEST LOG OUTPUT VECTOR AND A SERVICE TICKET REPRESENTED IN THE SERVICE TICKET OUTPUT VECTOR

906 — THRESHOLD SATISFIED?          YES

NO

908 — IN RESPONSE TO THE PROBABILITY BEING DETERMINED NOT TO SATISFY A THRESHOLD RELATION PROBABILITY, DETERMINING THAT THE TEST LOG COMPRISES A PREVIOUSLY UNIDENTIFIED PROBLEM

910 — IN RESPONSE TO THE PROBABILITY BEING DETERMINED TO SATISFY A THRESHOLD RELATION PROBABILITY, MARKING THE TEST LOG AND THE SERVICE TICKET AS RELATED

FIG. 9

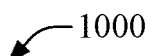

1000

1002 —— BASED ON TEST LOG DATA REPRESENTATIVE OF TEST LOGS AND USING MACHINE LEARNING ATTENTION, GENERATING, BY A SYSTEM COMPRISING A PROCESSOR, A TEST LOG OUTPUT VECTOR

1004 —— BASED ON THE TEST LOG OUTPUT VECTOR AND A SERVICE TICKET OUTPUT VECTOR, DETERMINING, BY THE SYSTEM, A PROBABILITY THAT A TEST LOG REPRESENTED IN THE TEST LOG OUTPUT VECTOR IS RELATED TO A SERVICE TICKET REPRESENTED IN THE SERVICE TICKET OUTPUT VECTOR

FIG. 10

AUTOMATIC CORRELATION OF TEST LOGS WITH SERVICE TICKET

BACKGROUND

In quality engineering, thousands of test logs can be created daily. When matching a test with failed result to a filed defect service ticket, conventional methods, such as manual matching, rule-based matching, or text-matching methods yield low-accuracy results. It is also time consuming to compose or modify corresponding rules and matching criteria. Moreover, text-based searching and matching focuses on key strings, such as "error," in a single type of log, but overlooks important events recorded in other logs generated from various components.

The above-described background relating to test log correlation is merely intended to provide a contextual overview of some current issues and is not intended to be exhaustive. Other contextual information may become further apparent upon review of the following detailed description.

BRIEF DESCRIPTION OF DRAWINGS

FIG. 7A is an equation diagram for system training in accordance with one or more embodiments described herein.

FIG. 7B is an equation diagram for system training in accordance with one or more embodiments described herein.

FIG. 8 is a block flow diagram for a process associated with automatic correlation of test logs with service ticket in accordance with one or more embodiments described herein.

FIG. 9 is a block flow diagram for a process associated with automatic correlation of test logs with service ticket in accordance with one or more embodiments described herein.

FIG. 10 is a block flow diagram for a process associated with automatic correlation of test logs with service ticket in accordance with one or more embodiments described herein.

DETAILED DESCRIPTION

Figure 1:
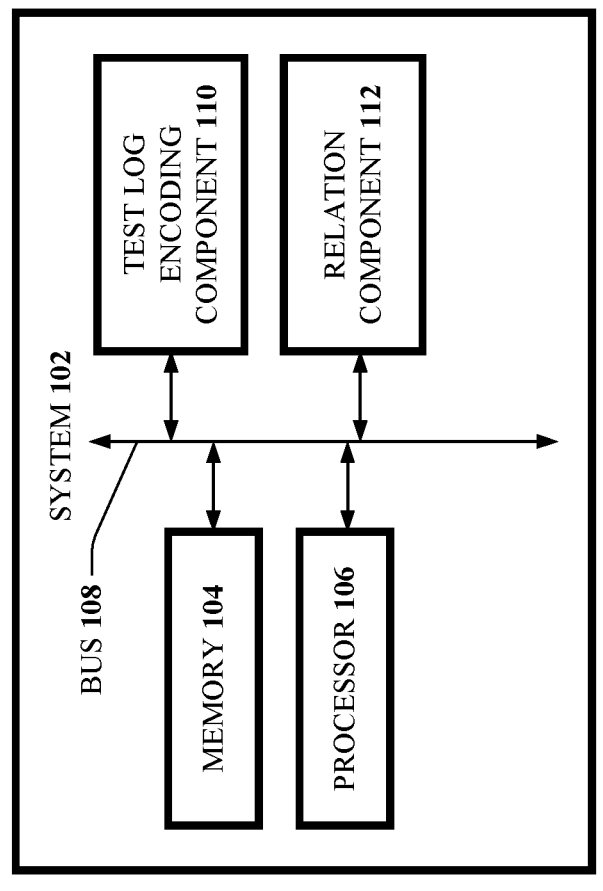
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, test log correlation can be improved in various ways, and various embodiments are described herein to this end and/or other ends. The disclosed subject matter relates to test log correlation and, more particularly, to automatic correlation of test logs with service tickets.

According to an embodiment, a system can comprise a processor, and a memory that stores executable instructions that, when executed by the processor, facilitate performance of operations, comprising, based on test log data representative of test logs and using machine learning attention, generating a test log output vector, based on the test log output vector and a service ticket output vector, determining a probability of a relation between a test log represented in the test log output vector and a service ticket represented in the service ticket output vector, and in response to the probability being determined to satisfy a threshold relation probability, marking the test log and the service ticket as related.

In various embodiments, the generating of the test log output vector can further comprise generating the test log output vector using a test log neural network applied to the test log data. In one or more embodiments, the test log neural network can comprise a rectified linear unit activation function.

In various embodiments, the service ticket output vector can be generated using a service ticket neural network applied to service ticket data representative of service tickets. In this regard, the service ticket data can comprise a service ticket sparse matrix. Further in this regard, the service ticket neural network can comprise a rectified linear unit activation function.

In various embodiments, the test log data can comprise a test log sparse matrix.

In various embodiments, the determining of the probability of the relation between the test log and the service ticket can comprise concatenating the test log output vector and the service ticket output vector, resulting in a concatenated relation vector, and inputting the concatenated relation vector to a relation neural network. In this regard, the relation neural network comprises a softmax activation function.

In another embodiment, a non-transitory machine-readable medium can comprise executable instructions that, when executed by a processor, facilitate performance of operations, comprising, based on test log data representative of test logs and using machine learning attention, generating a test log output vector, based on the test log output vector and a service ticket output vector, determining a probability of a relation between a test log represented in the test log output vector and a service ticket represented in the service ticket output vector, and in response to the probability being determined not to satisfy a threshold relation probability, determining that the test log comprises a previously unidentified problem.

In various embodiments, the generating of the test log output vector can comprise generating the test log output vector using a test log neural network applied to the test log data. In this regard, the test log neural network can comprise a rectified linear unit activation function.

In various embodiments, the service ticket output vector can be generated using a service ticket neural network applied to service ticket data representative of service tickets. In this regard, the service ticket data can comprise a service ticket sparse matrix. Further in this regard, the service ticket neural network can comprise a rectified linear unit activation function.

In yet another embodiment, a method can comprise, based on test log data representative of test logs and using machine learning attention, generating, by a system comprising a processor, a test log output vector, and based on the test log output vector and a service ticket output vector, determining, by the system, a probability that a test log represented in the test log output vector is related to a service ticket represented in the service ticket output vector.

In various embodiments, the method can further comprise generating, by the system, an output representative of the probability.

In various embodiments, the determining of the probability that the test log is related to the service ticket can comprise concatenating the test log output vector and the service ticket output vector, resulting in a concatenated relation vector, and subjecting the concatenated relation vector to a relation neural network. In this regard, the relation neural network can comprise a softmax activation function.

In various embodiments, the test log data can comprise a test log sparse matrix.

Various embodiments herein can comprise and/or be based on machine learning. Embodiments herein can comprise a process that utilizes two inputs: (1) test logs from failed tests, and (2) an existing service ticket (e.g., in the form of sparse matrix), and calculates the probability of their relationship (e.g., if the failure is due to the issue filed in the ticket). Test logs herein can originate from a variety of sources, such as systems, clients, cluster, storage, etc. In various embodiments, test logs herein can comprise data representative of one or more of a variety of failures, such as permission denial, cluster failing, storage inaccessible, etc. Such test logs can be generated from an operating system (OS), applications, clients, storage, etc. In various embodiments, service tickets herein can be utilized to track engineering problems, in which a software or hardware problem is mapped one-to-one with a service ticket. Thus, a plurality of test logs can be applicable to a single service ticket (e.g., when the problem occurs with frequency). In various embodiments, natural language processing methods, such as one-hot vector can be utilized to generate sparse matrices herein.

Embodiments herein can comprise a log encoder (e.g., a test log encoding component) and ticket encoder (e.g., a service ticket encoding component), which can convey logs and tickets contents (e.g., sparse matrices) into corresponding vectors. A modified attention module connected with neural network can be utilized so that the log encoder is aware of all test events, and not just one timeline of events. Meanwhile, the rows that passed into the ticket encoder can already possess information about positioning, as each one is comprised of a ticket section, such as ticket properties versus ticket title, and thus no extra positional encoding is necessary. In this regard, the ticket encoder can flatten the input to generate the output vector.

Embodiments herein can estimate the relationship of the extracted data from the given logs and ticket. Thus, embodiments herein can concatenate the data and direct them into a neural network (e.g., with a softmax activation function). In various embodiments, due to the concatenation, the weights in the neural network can be shared by both logs and tickets. The resulting percentage (e.g., a scalar) can represent the probability that the failure relates to the given service ticket. Loss function(s) herein can be based on binary cross entropy, which judge the distance of probability distributions between the generated and the real values. Gradient descent can be utilized to update the parameters in the model, for instance, by minimizing loss.

Turning now to FIG. 1, there is illustrated an example, non-limiting system 102 in accordance with one or more embodiments herein. System 102 can comprise a computerized tool, which can be configured to perform various operations relating to automatic correlation of test logs with service ticket. The system 102 can comprise one or more of a variety of components, such as memory 104, processor 106, bus 108, test log encoding component 110, and/or relation component 112. In various embodiments, one or more of the memory 104, processor 106, bus 108, test log encoding component 110, and/or relation component 112 can be communicatively or operably coupled (e.g., over a bus or wireless network) to one another to perform one or more functions of the system 102.

In various embodiments, the test log encoding component 110 can, based on test log data representative of test logs (e.g., test logs 602) and using machine learning attention (e.g., attention 302), generate a test log output vector. The attention 302 can be utilized to determine and/or extract relevant information in the test logs. In one or more embodiments, the generating (e.g., via the test log encoding component 110) of the test log output vector can further comprise generating (e.g., via the test log encoding component 110) the test log output vector using a test log neural network 304 applied to the test log data. In this regard, the test log neural network 304 can comprise a rectified linear unit (ReLU) activation function. It is noted that the test log data can comprise a test log sparse matrix.

In various embodiments, the relation component 112 can, based on the test log output vector and a service ticket output vector, determine a probability of a relation between a test log represented in the test log output vector and a service ticket represented in the service ticket output vector. In one or more embodiments, the relation component 112 can the determine the probability of the relation between the test log and the service ticket by utilizing a concatenate 502 process applied the test log output vector and the service ticket output vector, resulting in a concatenated relation vector. It is noted that the foregoing can be performed for every possible match between a test log and service ticket. In this regard, during concatenate 502, two vectors can be combined into a single vector (e.g., along a defined dimension). The relation component can further input the concatenated relation vector to a relation neural network 504. In one or more embodiments, the relation neural network 504 can comprise a softmax activation function.

In various embodiments, the relation component 112 can generate an output representative of the probability of relation between a test log herein a service ticket herein. Such an output can be rendered in a text or graphical based output, for instance, on a display device or user interface device or component.

In various embodiments, the relation component 112 can, in response to the probability being determined (e.g., via the relation component 112) to satisfy a threshold relation probability, mark the test log and the service ticket as related. Such a marking can be rendered in a text or graphical based output, for instance, on a display device or user interface device or component.

In further embodiments, the relation component 112 can, in response to the probability being determined not to satisfy a threshold relation probability, determine that the test log comprises a previously unidentified problem. In this regard, the system 102 can be configured to generate a new service ticket for the test log, since the test log does not match a service ticket with a defined threshold level of confidence.

Figure 2:
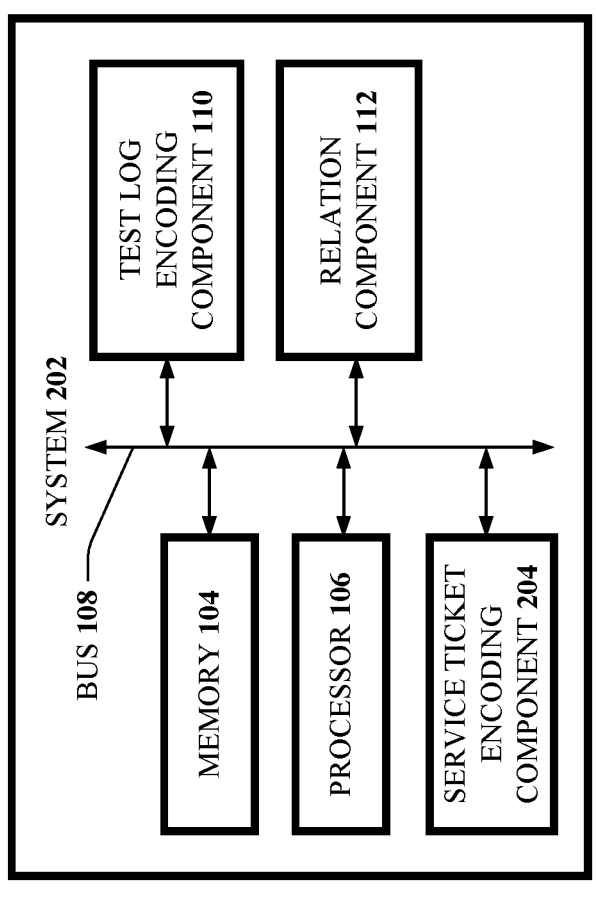
FIG. 2 is a block diagram of an exemplary system in accordance with one or more embodiments described herein.
Figure 3:
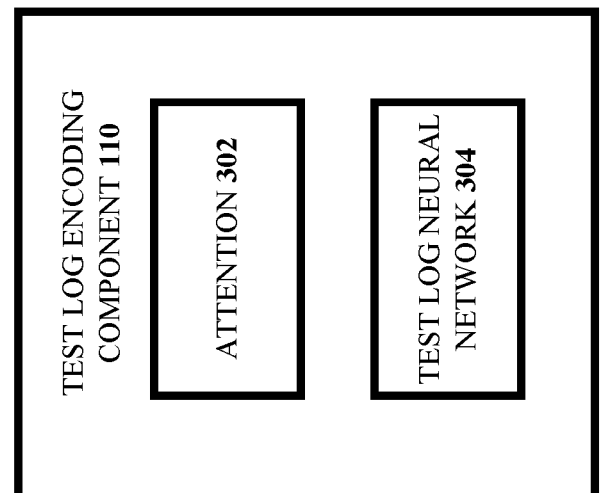
FIG. 3 is a block diagram of an exemplary test log encoding component in accordance with one or more embodiments described herein.
Figure 4:
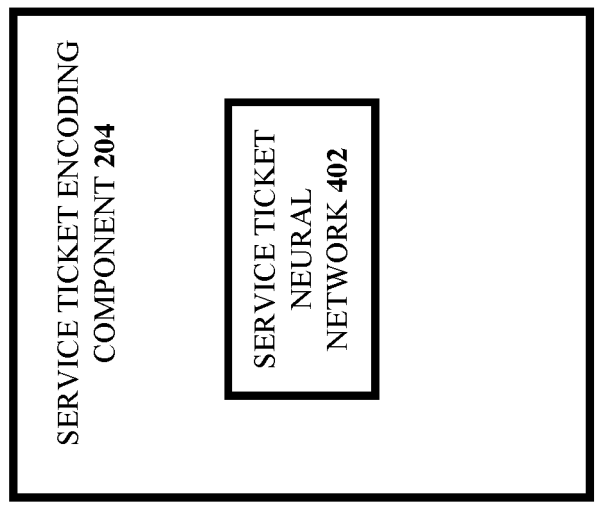
FIG. 4 is a block diagram of an exemplary service ticket encoding component in accordance with one or more embodiments described herein.
Figure 5:
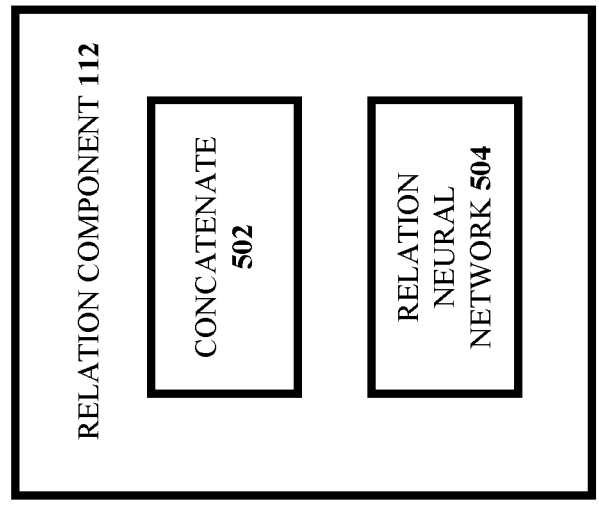
FIG. 5 is a block diagram of an exemplary relation component in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to automatic correlation of test logs with service ticket. The system 202 can be similar to system 102, and can comprise one or more of a variety of components, such as memory 104, processor 106, bus 108, encoding component 110, and/or relation component 112. The system 202 can further comprise a service ticket encoding component 204. In various embodiments, one or more of the memory 104, processor 106, bus 108, test log encoding component 110, relation component 112, and/or service ticket encoding component 204 can be communicatively or operably coupled (e.g., over a bus or wireless network) to one another to perform one or more functions of the system 202.

In various embodiments, a service ticket output vector herein can be generated by a service ticket encoding component 204, for instance, using a service ticket neural network 402 applied to service ticket data representative of service tickets. In one or more embodiments, the service ticket data can comprise a service ticket sparse matrix. In various embodiments, the service ticket neural network 402 can comprise a ReLU activation function.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, a system herein can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by a system herein. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a system herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, a system herein can perform a utility-based analysis that factors cost of initiating the above-described operations versus benefit. In this embodiment, a system herein can use one or more additional context conditions to determine various thresholds herein.

To facilitate the above-described functions, a system herein can perform classifications, correlations, inferences, and/or expressions associated with principles of artificial intelligence. For instance, a system herein can employ an automatic classification system and/or an automatic classification. In one example, a system herein can employ a probabilistic and/or statistical-based analysis (e.g., factoring into the analysis utilities and costs) to learn and/or generate inferences. A system herein can employ any suitable machine-learning based techniques, statistical-based techniques and/or probabilistic-based techniques. For example, a system herein can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, a system herein can perform a set of machine-learning computations. For instance, a system herein can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 6:
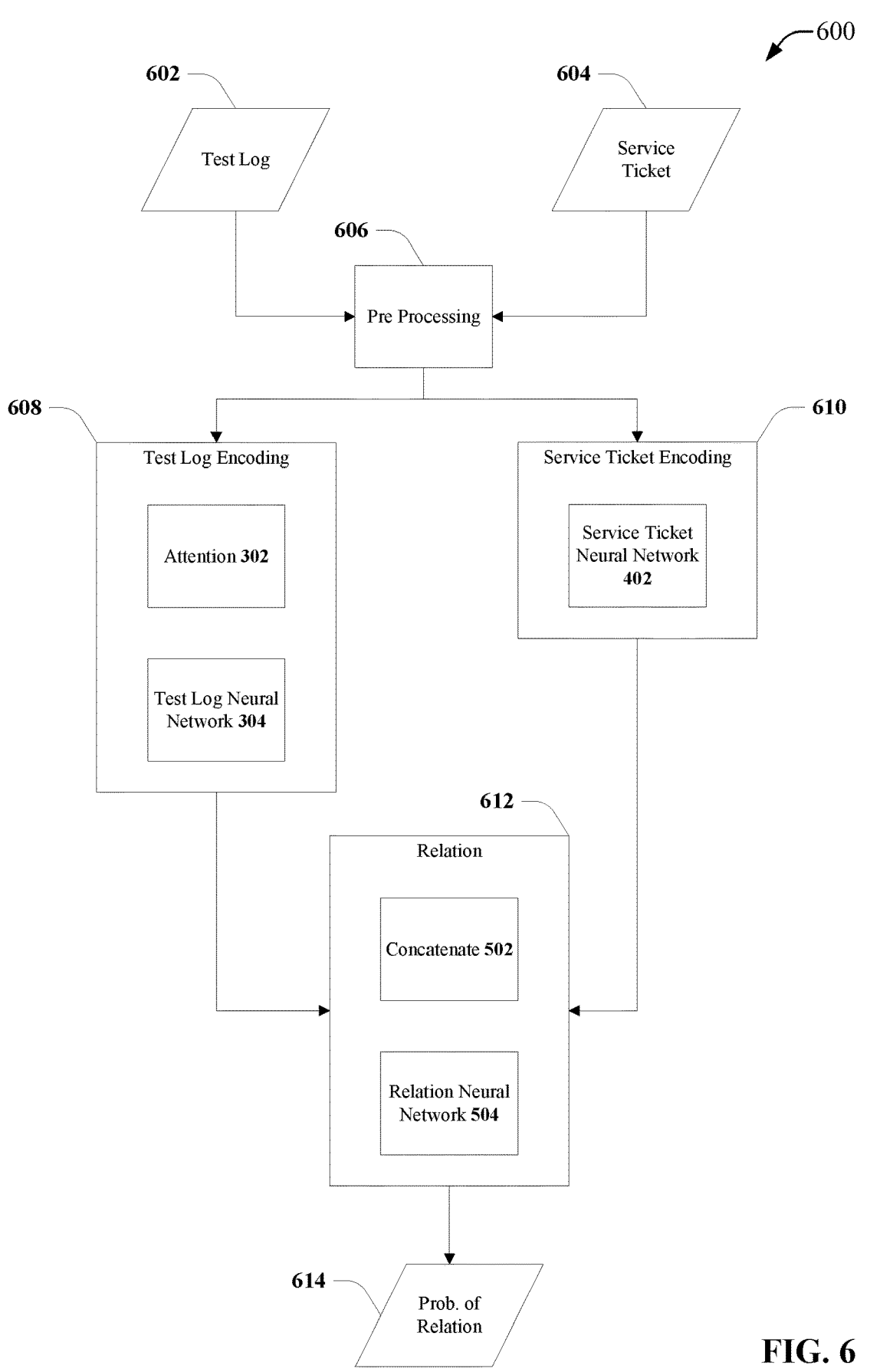
FIG. 6 is a flowchart for a process associated with automatic correlation of test logs with service ticket in accordance with one or more embodiments described herein.

FIG. 6 is a flowchart for a process 600 associated with automatic correlation of test logs with service ticket in accordance with one or more embodiments described herein. At 606, pre-processing on test log(s) 602 and service ticket (s) 604 can be performed (e.g., by a system herein). Such pre-processing can comprise a docs-to-vectors process, in which input string lines are converted to a sparse matrix. In this regard, textual data can be converted into vector representations, in which text is represented as a numerical vector. For example, string lines in test logs can comprise events. String lines in service tickets can comprise a title, a description of a software bug, etc. At 608, test log encoding can be performed (e.g., via the test log encoding component 110). Using attention 302 and/or a test log neural network 304, the test log encoding component 110 can utilize a sparse matrix as an input and output a vector representation. At 610, service ticket encoding can be performed (e.g., via the service ticket encoding component 204). Using the service ticket neural network 402, the service ticket encoding component 204 can utilize a sparse matrix as an input and output a vector. At 612, relation between the test log 602 and the service ticket 604 can be determined (e.g., via the relation component 112). Using concatenate 502 and/or a relation neural network 504, the relation component 112 can take a vector as an input and output a scalar, resulting in probability of relation 614.

FIG. 7A is an equation diagram 700 for system training in accordance with one or more embodiments described herein. In diagram 700, method 706 can be utilized in order to convert input 702 to output 704. In this regard, one or more of the following steps can be utilized:

1. Each test log can be transformed into a n-gram sparse matrix, in which each row of the sparse matrix represents a log of a timestamp (e.g., during pre-processing herein). Each service ticket can be converted to a n-gram sparse matrix, in which each row represents a position of the ticket content (e.g., the first row can be for the title of the ticket and the second row can describe categories) (e.g., during pre-processing herein). In various embodiments, D can comprise defined training data. $X_1$ can represent a log. $Y_1$ can represent a service ticket. $T_1$ can represent the label of whether $X_1$ is caused by $Y_1$.

2. The output 704 (e.g., via the relation component 112) can comprise parameter $\theta$, which can be utilized to calculate the possibility of a given test log belonging to a given service ticket. It is noted that $W_q$, $W_k$, and $W_v$ can be weights in the attention model. $W_1$ and $B_1$ can be weights and/or bias for the test log encoding component 110. $W_t$ and $B_t$ can be weights and/or bias for the service ticket encoding component 204. $W_r$ and $B_r$ can be weights and/or bias for the relation component 112. For each episode e, there can be n samples.

3. Start training a random episode, in total of $N_e$ episodes.

4. Randomly select samples. If N equals 1, training herein can become stochastic training.

5. Encode the test log content into a vector using an attention based neural network (e.g., attention 302 and/or test log neural network 304) (e.g., via the test log encoding component 110).

6. Encode the service ticket content into a vector using neural network (e.g., service ticket neural network 402) (e.g., via the service ticket encoding component 204).

7. Concatenate (e.g., concatenate 502) the two vectors and pass it though a neural network (e.g., relation neural network 504) for generating a probability (e.g., via the relation component 112).

8. Use the tag from sample as the true relationship of the sample log and ticket (e.g., via the relation component 112).

9. Use Binary Cross Entropy as the distance function between generated probability and true relationship—the loss function is sum of all distances (e.g., via the relation component 112). q can be the probability generated by a system herein, and p can be the real label.

10. Update the parameters using gradient descent, with the learning rate optimized by Adam (e.g., via the relation component 112).

FIG. 7B is an equation diagram 708 for system training in accordance with one or more embodiments described herein. One or more equations from equation diagram 708 can be utilized in the method 706.

FIG. 8 illustrates a block flow diagram for a process 800 associated with automatic correlation of test logs with service ticket in accordance with one or more embodiments described herein. At 802, the process 800 can comprise, based on test log data representative of test logs and using machine learning attention, generating (e.g., via the test log encoding component 110) a test log output vector. At 804, the process 800 can comprise, based on the test log output vector and a service ticket output vector, determining (e.g., via the relation component 112) a probability of a relation between a test log represented in the test log output vector and a service ticket represented in the service ticket output vector. At 806, if a threshold relation probability is satisfied, the process 800 can proceed to 808. If at 806, the threshold relation probability is not satisfied, the process can return to 802. At 808, the process 800 can comprise, in response to the probability being determined to satisfy a threshold relation probability, marking (e.g., via the relation component 112) the test log and the service ticket as related.

FIG. 9 illustrates a block flow diagram for a process 900 associated with automatic correlation of test logs with service ticket in accordance with one or more embodiments described herein. At 902, the process 900 can comprise, based on test log data representative of test logs and using machine learning attention, generating (e.g., via the test log encoding component 110) a test log output vector. At 904, the process 900 can comprise, based on the test log output vector and a service ticket output vector, determining (e.g., via the relation component 112) a probability of a relation between a test log represented in the test log output vector and a service ticket represented in the service ticket output vector. At 906, if a threshold relation probability is not satisfied, the process 900 can proceed to 908. If at 906, the threshold relation probability is satisfied, the process can proceed to 910. At 908, the process 900 can comprise, in response to the probability being determined not to satisfy a threshold relation probability, determining (e.g., via the relation component 112) that the test log comprises a previously unidentified problem. At 910, the process 900 can comprise, in response to the probability being determined to satisfy a threshold relation probability, marking (e.g., via the relation component 112) the test log and the service ticket as related.

FIG. 10 illustrates a block flow diagram for a process 1000 associated with automatic correlation of test logs with service ticket in accordance with one or more embodiments described herein. At 1002, the process 1000 can comprise, based on test log data representative of test logs and using machine learning attention, generating, by a system comprising a processor (e.g., via the test log encoding component 110), a test log output vector. At 1004, the process 1000 can comprise, based on the test log output vector and a service ticket output vector, determining, by the system (e.g., via the relation component 112), a probability that a test log represented in the test log output vector is related to a service ticket represented in the service ticket output vector.

Figure 11:
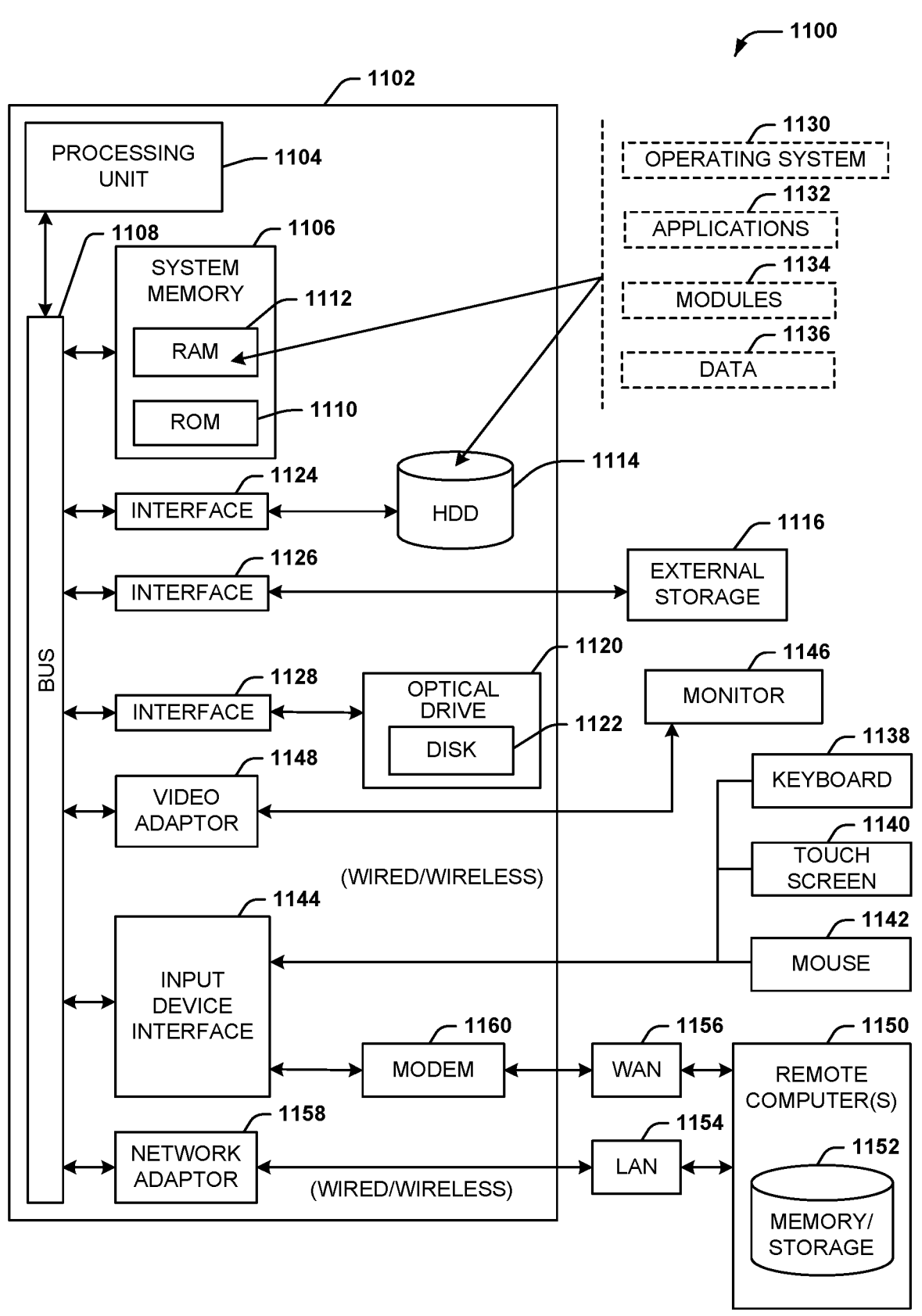
FIG. 11 is an example, non-limiting computing environment in which one or more embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a disk 1122, such as a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
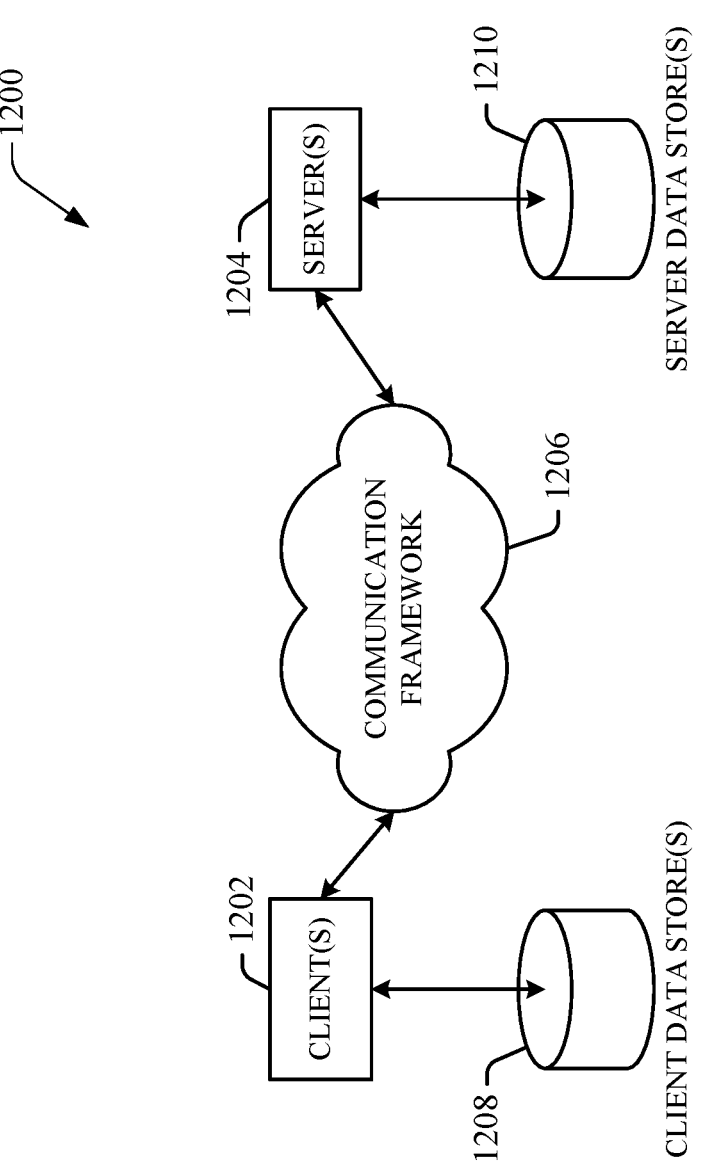
FIG. 12 is an example, non-limiting networking environment in which one or more embodiments described herein can be implemented.

Referring now to FIG. 12, there is illustrated a schematic block diagram of a computing environment 1200 in accordance with this specification. The system 1200 includes one or more client(s) 1202, (e.g., computers, smart phones, tablets, cameras, PDA's). The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware or hardware in combination with software (e.g., threads, processes, computing devices). The servers 1204 can house threads to perform transformations of media items by employing aspects of this disclosure, for example. One possible communication between a client 1202 and a server 1204 can be in the form of a data packet adapted to be transmitted between two or more computer processes wherein data packets may include coded analyzed headspaces and/or input. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

In one exemplary implementation, a client 1202 can transfer an encoded file, (e.g., encoded media item), to server 1204. Server 1204 can store the file, decode the file, or transmit the file to another client 1202. It is noted that a client 1202 can also transfer uncompressed file to a server 1204 and server 1204 can compress the file and/or transform the file in accordance with this disclosure. Likewise, server 1204 can encode information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

based on test log data representative of test logs and using machine learning attention, generating a test log output vector, wherein the generating of the test log output vector further comprises generating the test log output vector using a test log neural network applied to the test log data;

based on the test log output vector and a service ticket output vector, determining a probability of a relation between a test log represented in the test log output vector and a service ticket represented in the service ticket output vector; and in response to the probability being determined to satisfy a threshold relation probability, marking the test log and the service ticket as related.

2. The system of claim 1, wherein the test log neural network comprises a rectified linear unit activation function.

3. The system of claim 1, wherein the service ticket output vector is generated using a service ticket neural network applied to service ticket data representative of service tickets.

4. The system of claim 3, wherein the service ticket data comprises a service ticket sparse matrix.

5. The system of claim 3, wherein the service ticket neural network comprises a rectified linear unit activation function.

6. The system of claim 1, wherein the test log data comprises a test log sparse matrix.

7. The system of claim 1, wherein the determining of the probability of the relation between the test log and the service ticket comprises:

concatenating the test log output vector and the service ticket output vector, resulting in a concatenated relation vector, and inputting the concatenated relation vector to a relation neural network.

8. The system of claim 7, wherein the relation neural network comprises a softmax activation function.

9. A non-transitory machine-readable medium, comprising executable instructions that, when executed by at least one processor, facilitate performance of operations, comprising:

based on test log data representative of test logs and using machine learning attention, generating a test log output vector;

based on the test log output vector and a service ticket output vector, determining a probability of a relation between a test log represented in the test log output vector and a service ticket represented in the service ticket output vector, wherein the service ticket output vector is generated using a service ticket neural network applied to service ticket data representative of service tickets; and in response to the probability being determined not to satisfy a threshold relation probability, determining that the test log comprises a previously unidentified problem.

10. The non-transitory machine-readable medium of claim 9, wherein the generating of the test log output vector comprises generating the test log output vector using a test log neural network applied to the test log data.

11. The non-transitory machine-readable medium of claim 10, wherein the test log neural network comprises a rectified linear unit activation function.

12. The non-transitory machine-readable medium of claim 9, wherein the service ticket data comprises a service ticket sparse matrix.

13. The non-transitory machine-readable medium of claim 9, wherein the service ticket neural network comprises a rectified linear unit activation function.

14. The non-transitory machine-readable medium of claim 9, wherein the determining of the probability of the relation between the test log and the service ticket comprises:

concatenating the test log output vector and the service ticket output vector, resulting in a concatenated relation vector, and inputting the concatenated relation vector to a relation neural network.

15. A method, comprising:

based on test log data representative of test logs and using machine learning attention, generating, by a system comprising at least one processor, a test log output vector; and based on the test log output vector and a service ticket output vector, determining, by the system, a probability that a test log represented in the test log output vector is related to a service ticket represented in the service ticket output vector, wherein the determining of the probability that the test log is related to the service ticket comprises:

concatenating the test log output vector and the service ticket output vector, resulting in a concatenated relation vector, and subjecting the concatenated relation vector to a relation neural network.

16. The method of claim 15, further comprising:

generating, by the system, an output representative of the probability.

17. The method of claim 16, wherein the relation neural network comprises a softmax activation function.

18. The method of claim 15, wherein the test log data comprises a test log sparse matrix.

19. The method of claim 15, wherein the generating of the test log output vector comprises generating the test log output vector using a test log neural network applied to the test log data.

20. The method of claim 15, wherein the service ticket output vector is generated using a service ticket neural network applied to service ticket data representative of service tickets.

* * * * *